United States Patent [19]
Nagasawa

[11] Patent Number: 5,561,980
[45] Date of Patent: Oct. 8, 1996

[54] TANDEM MASTER CYLINDER

[75] Inventor: Akio Nagasawa, Kyoto, Japan

[73] Assignees: Topy Industries, Limited; Miyako Jidosha Kogyo Kabushikigaisha, both of Tokyo, Japan; a part interest

[21] Appl. No.: 524,204

[22] Filed: Sep. 8, 1995

[30]      Foreign Application Priority Data

Sep. 12, 1994  [JP]  Japan .................................. 6-242433

[51] Int. Cl.⁶ .............................. B60T 11/20; F01B 31/14
[52] U.S. Cl. .................................. 60/562; 60/589; 92/13.3
[58] Field of Search ............................... 60/562, 585, 586, 60/587, 588, 589, 591, 582; 92/13.3

[56]          References Cited

U.S. PATENT DOCUMENTS

| | | | |
|---|---|---|---|
| 4,078,386 | 3/1978 | Ewald | 60/562 |
| 4,885,910 | 12/1989 | Resch | 60/562 |
| 4,998,950 | 3/1991 | Derrick | 60/562 |
| 5,018,353 | 5/1991 | Pugh | 60/562 |
| 5,111,661 | 5/1992 | Savidan et al. | 60/589 X |
| 5,211,019 | 5/1993 | Bauer | 60/589 X |

FOREIGN PATENT DOCUMENTS

| | | |
|---|---|---|
| 5-25705 | 4/1993 | Japan . |
| 60-21098 | 5/1995 | Japan . |

*Primary Examiner*—Hoang Nguyen
*Attorney, Agent, or Firm*—Collard & Roe, P.C.

[57]          ABSTRACT

A tandem master cylinder having a small-diameter cylinder formed on the same axis as a cylinder bore in a floating piston, communicating with a primary fluid pressure chamber and a secondary fluid pressure chamber. A small-diameter piston is movably inserted in the small-diameter cylinder, dividing the primary fluid pressure chamber from the secondary fluid pressure chamber. A small-diameter piston spring is mounted in the small-diameter cylinder, pressing the small-diameter piston toward the secondary fluid pressure chamber. A stop is provided in the small-diameter cylinder to stop the forward movement of the small-diameter piston in the small-diameter cylinder. An elastic member is disposed in an unbiased state between the small-diameter piston and a cylinder front end wall. The elastic member has an elastic force in a direction of compression which is greater than that of the small-diameter piston spring. In case of a failure of the primary fluid pressure chamber, the tandem master cylinder immediately produces a fluid pressure in the secondary fluid pressure chamber while compressing the elastic member after making an ineffective stroke, equivalent to the discharge of the primary fluid pressure chamber, until it mechanically contacts the floating piston.

5 Claims, 4 Drawing Sheets

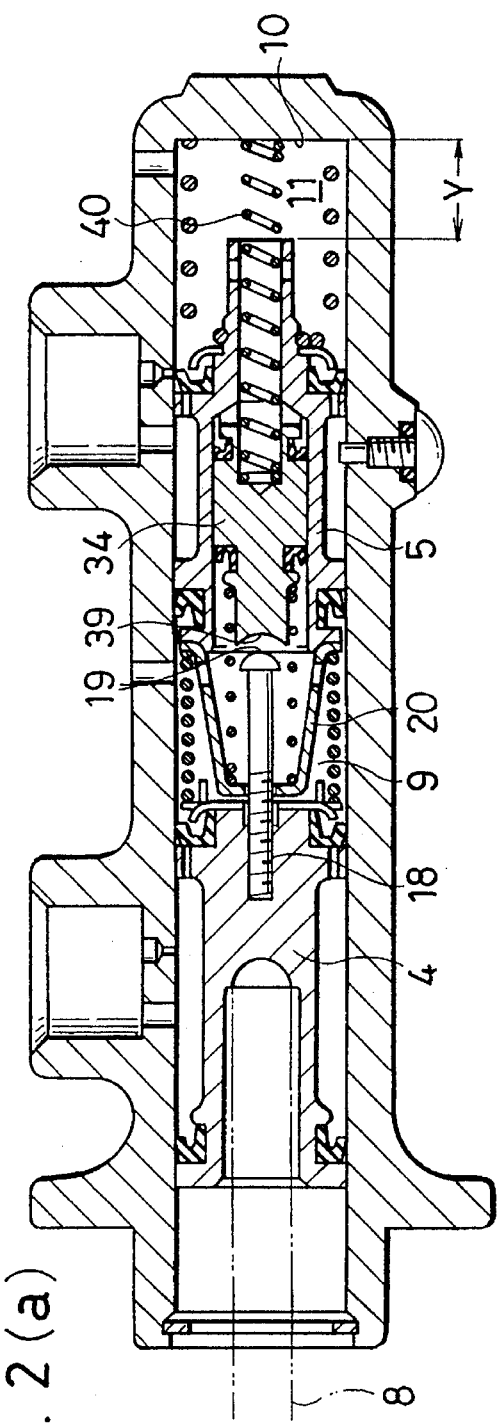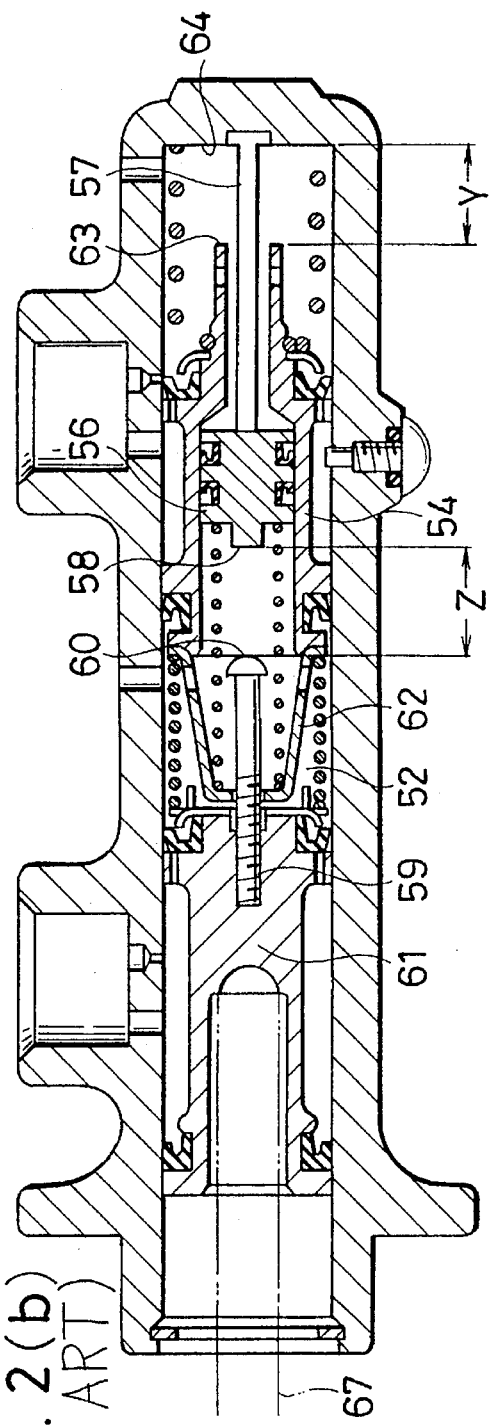
FIG. 2(a)
FIG. 2(b) (PRIOR ART)

5,561,980

TANDEM MASTER CYLINDER

BACKGROUND OF THE INVENTION

1. Field of the Invention

The present invention relates to improvements in a tandem master cylinder of a braking system for automobiles in which two mutually independent brake fluid pressures are produced.

2. Description of the Related Art

In a certain type of conventional tandem master cylinder, e.g., a tandem master cylinder disclosed in Japanese Patent Publication No. Sho 60-21098, the mounting load of a primary return spring located at the back of a floating piston is set greater than the mounting load of a secondary return spring located at the front of the floating piston, so that a main piston and the floating piston may be moved forward simultaneously at the start of brake application to close two return ports simultaneously, thereby decreasing an ineffective stroke at the time of braking. A small-diameter piston receives a fluid pressure from a primary fluid chamber behind the floating piston and from a secondary fluid chamber before the floating piston is inserted in a small-diameter cylinder formed in the floating piston while the main piston and the floating piston are moving forward together as one unit, the small-diameter piston is moved backward in relation to the forward movement of the floating piston by a fluid pressure built up in the secondary fluid chamber or by a rod member, thus restricting a sudden increase in the fluid pressure in the secondary fluid pressure chamber and consequently preventing biting of a piston seal of the floating piston passing over the return port. This type of tandem master cylinders, where the small-diameter piston is moved backward with the forward movement of the piston by a rod member has been disclosed in Japanese Patent Publication No. Hei 5-25705, which is as shown in FIG. 4.

In FIG. 4, of the means for restraining a sudden increase in the fluid pressure in a secondary fluid pressure chamber 53 by offsetting a relative volumetric change resulting from the backward movement of a small-diameter piston 56 which is inserted in a small-diameter cylinder 55 provided in a floating piston 54. During forward movement of the floating piston 54 when the operation of the tandem master cylinder 51 starts, a rigid rod member 57 prevents the follow-up movement of the small-diameter piston 56 in the forward direction of the floating piston 54. Therefore the positional relationship between the rear boss 58 of the small-diameter piston 56 and the head section 60 of the stopping rod 59 is restricted in design in an attempt to satisfy the overall discharge of the tandem master cylinder 51. In FIG. 4, therefore, there must be established the relationship Z=X+Y, where X is a distance between the front end of the main piston 61 in the home position and a cup-shaped spring retainer 62 (equivalent to the discharge of the primary fluid pressure chamber 52), Y is a distance between the front end 63 of the floating piston 54 in home position and the front end wall 64 of the cylinder (equivalent to the discharge of the secondary fluid pressure chamber 53), and Z is a distance between the head section 60 of the stopping rod 59 and the rear boss 58 of the small-diameter piston 56.

In the tandem master cylinder of FIG. 4, when braking operation is done without any fluid pressure built up in the primary fluid pressure chamber 52 for some reason or other, the floating piston 54 starts moving, and after the piston seal 65 has closed the return port 66, the fluid pressure is built up in the secondary fluid pressure chamber 53. At this time, a fluid pressure increase in the secondary fluid pressure chamber 53 is delayed, and accordingly there occurs a delay of brake pressure application to the braking equipment, until the small-diameter piston 56 inserted in the floating piston 54 makes a relative backward movement with respect to the floating piston 54 and the head section 60 of the stopping rod 59 which is moving forward comes into contact with the rear boss 58 of the small-diameter piston 56. A volumetric increase occurs corresponding to the volumetric decrease of the secondary fluid pressure chamber 53 caused by the forward movement of the floating piston 54. Reference numeral 67 denotes a push rod.

SUMMARY OF THE INVENTION

In view of the above-described problems, the present invention has an object to provide a tandem master cylinder which can decrease a time lag required for increasing the fluid pressure in the secondary fluid pressure chamber in case no fluid pressure is built up in the primary fluid pressure chamber, while restraining a sudden increase in a fluid pressure in a secondary fluid pressure chamber.

In a tandem master cylinder of the present invention comprising a main piston disposed at a rear end of a cylinder bore and a floating piston disposed between the main piston and a front end wall of the cylinder in such a manner that they can move into the cylinder; a primary fluid pressure chamber defined between the main piston and the floating piston, and a secondary fluid pressure chamber defined between the floating piston and the front end wall of the cylinder; with a mounting load of a primary return spring mounted behind the floating piston set greater than that of a secondary return spring disposed in a front of the floating piston; return ports which are closed and opened by piston seals mounted on front end sections of the main and floating pistons in the cylinder bore; a small-diameter cylinder, in the floating piston, communicating with the primary fluid pressure chamber and the secondary fluid pressure chamber, being formed coaxially in the cylinder bore, and a small-diameter piston inserted in the small-diameter cylinder the interior of which is divided into the primary fluid pressure chamber and the secondary fluid pressure chamber; and a small-diameter piston spring mounted for pressing the small-diameter piston toward the secondary fluid pressure chamber; there are provided a stopping section for stopping the forward movement of the small-diameter piston in the small-diameter cylinder and an elastic member, between the small-diameter piston and the front end wall of the cylinder, in a state of free length having an elastic force in a direction of compression and a greater elastic force than the small-diameter piston spring. According to the tandem master cylinder of the above-described constitution, on starting ordinary operation, the small-diameter piston spring having a low elastic force is compressed with the forward movement of the main piston and the floating piston, without compressing the elastic member of high elastic force, to move the small-diameter piston backward in relation to the forward movement of the floating piston. A sudden increase in the fluid pressure in the secondary fluid pressure chamber is restrained, and, the main piston makes an ineffective stroke proportional to the discharge of the primary fluid pressure chamber until it comes into mechanical contact with the floating piston in the event of a failure in pressure buildup in the primary fluid pressure chamber. Therefore the brake fluid pressure is built up immediately in the secondary fluid pressure chamber while the elastic member is being compressed. Therefore, in case of a failure in pressure buildup in the primary fluid pressure chamber, the time lag required for increasing the brake fluid pressure in the secondary fluid pressure chamber can be decreased.

BRIEF DESCRIPTION OF THE DRAWINGS

FIG. 2(a) and FIG. 2(b) show a tandem master cylinder of the present invention and a prior art tandem master cylinder showing a difference in the positional relation of the head section of the stopping rod and the rear boss of the small-diameter piston, during operation of only the secondary fluid pressure chamber in the event of a failure in pressure buildup in the primary fluid pressure chamber;

DETAILED DESCRIPTION OF THE PREFERRED EMBODIMENT

Figure 1:
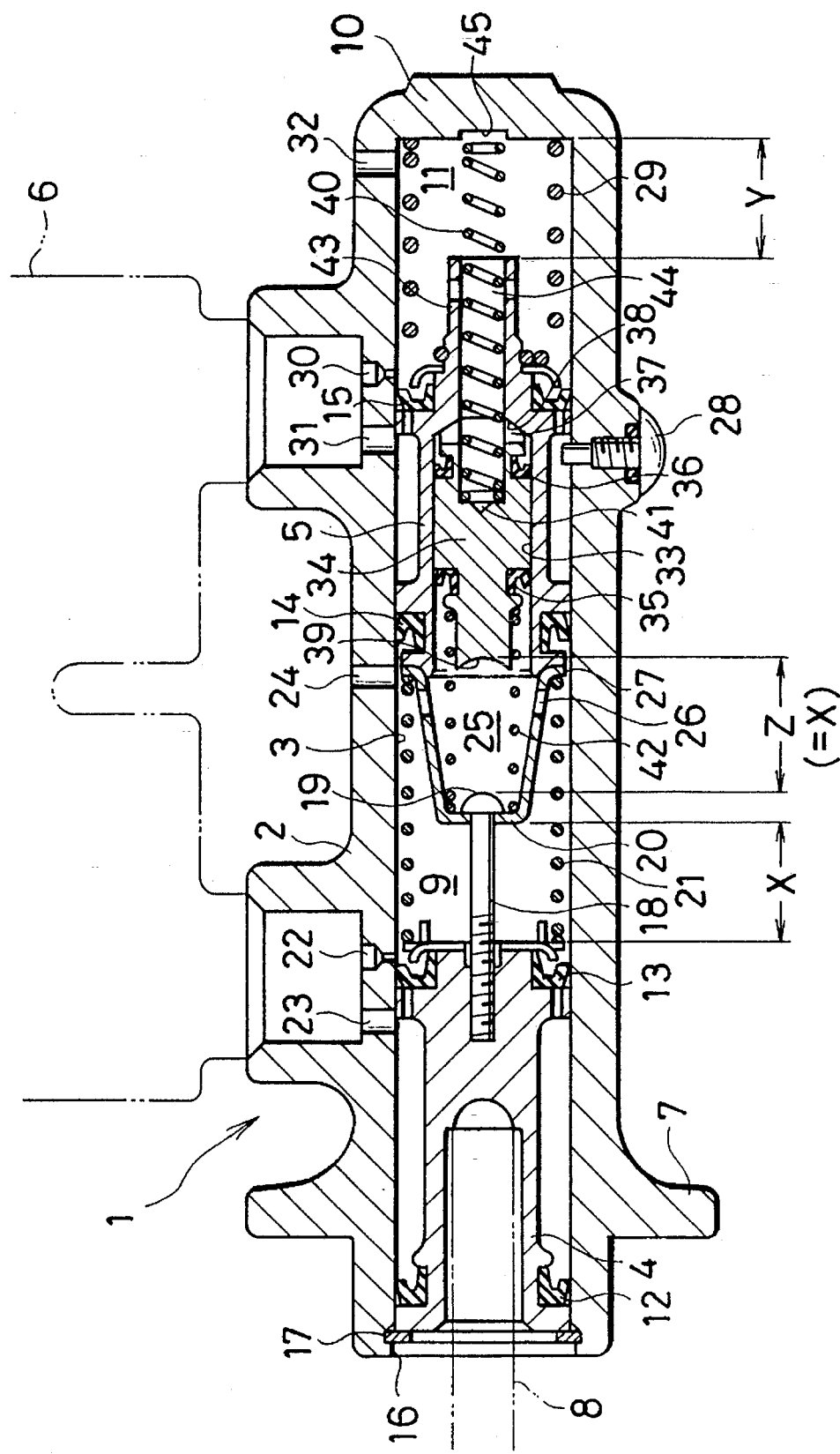
FIG. 1 is a sectional view of one embodiment of a tandem master cylinder according to the present invention.

FIG. 1 is a sectional view showing one embodiment of a tandem master cylinder of the present invention.

In the interior of the body 2 of the tandem master cylinder 1, a cylinder bore 3 is formed, and a main piston 4 and a floating piston 5 are movably inserted. A reservoir 6 is mounted in the upper part of the body 2, in which a specific quantity of brake oil is filled. A mounting flange 7 is provided; and a push rod 8 is operated by a servo motor or a brake pedal which are not shown.

In the cylinder bore 3, there are formed a primary fluid pressure chamber 9 between the main piston 4 and the floating piston 5, and a secondary fluid pressure chamber 11 between the floating piston 5 and a front end wall 10 of the cylinder. Reference numerals 12, 13, 14 and 15 denote annular piston seals which are mounted on the main piston 4 and the floating piston 5 and slide on the inner wall surface of the cylinder bore 3 with the movement of the main piston 4 and the floating piston 5.

In the open left end 16 of the cylinder bore 3 there is fixedly installed a stop ring 17, by which the maximum retreat position, i.e., the return position, of the main piston 4 is set.

In the front end section of the main piston 4 one end of a stopping rod 18 is threadedly inserted, while on the other end of the stopping rod 18 a head section 19 is formed. The head section 19 is disposed in an engaged state inside a cup-shaped spring retainer 20. Between the main piston 4 and the cup-shaped spring retainer 20, a primary return spring 21 whose mounting load is set by the engagement of the head section 19 with the cup-shaped spring retainer 20 is compressibly mounted.

Reference numeral 22 denotes a return port which is open to release the pressure of the primary fluid pressure chamber 9 out into the atmosphere in the reservoir 6. A supply port 23 is provided through which the brake fluid in the reservoir 6 is drawn into the primary fluid pressure chamber 9 from between the main piston 4 and the outer periphery of the piston seal 13 when the pressure of the primary fluid pressure chamber 9 has decreased lower than the atmosphere in the reservoir 6 during brake return operation. A an output port 24 connects the primary fluid pressure chamber 9 to one of the braking systems (not illustrated). A chamber 25 enclosed by the cup-shaped spring retainer 20 constantly communicates with the primary fluid pressure chamber 9 through a small hole 26.

The rear section of the floating piston 5 is in constant contact with a collar section 27 formed at the front of the cup-shaped spring retainer 20; when the main piston 4 is in the return position shown in FIG. 1, the floating piston 5 is given the maximum separate position from the main piston 4, that is, the return position shown in FIG. 1, by the mounting load of the primary return spring 21. Reference numeral 28 designates a stop bolt which is provided when required to limit the maximum retreat position of the floating piston 5.

Between the front section of the floating piston 5 and the cylinder front end wall 10 is installed a secondary return spring 29 having a lower mounting load than that of the primary return spring 21; the floating piston 5 is pressed by this secondary return spring 29 toward returning.

Reference numeral 30 denotes a return port for releasing the pressure of the secondary fluid pressure chamber 11 into the atmosphere in the reservoir 6. A supply port 31 is provided for drawing the brake fluid from the reservoir 6 into the secondary fluid pressure chamber 11 through between the outer periphery of the floating piston 5 and the piston seal 15 and the inner wall of the cylinder bore 3 when the pressure of the secondary fluid pressure chamber 11 has decreased lower than the atmosphere in the reservoir 6 during brake returning operation. An output port 32 connects the secondary fluid pressure chamber 11 to the other braking system (not shown).

Within the floating piston 5 a small-diameter cylinder 33 resides coaxially with the cylinder bore 3; in this small-diameter cylinder 33 a small diameter piston 34 is longitudinally movably inserted. Reference numerals 35 and 36 denote small-diameter piston seals which are mounted on the small-diameter piston 34 and slide on the inner wall surface of the small-diameter cylinder 33. The small-diameter piston seal 35 is mounted to prevent leakage of the fluid pressure from the chamber 25 communicating with the primary fluid pressure chamber 9 through the small port 26 to a chamber 37 communicating with the secondary fluid pressure chamber 11, and the small-diameter piston seal 36 is mounted to prevent leakage of the fluid pressure reversely the chamber 37 to the chamber 25. The chamber 37 is formed between a stopping section 38 provided on the end wall section of the small-diameter cylinder 33 and the front end section of the small-diameter piston 34 for the purpose of checking the forward movement of the small-diameter piston 34 in the small-diameter cylinder 33.

At the rear end of the small-diameter piston 34, a boss 39 is formed, facing to contact the head section 19 of the stopping rod 18; and at the front is formed a spring receiving hole 41 into which the rear end of a coil spring 40 as an elastic member having elasticity in the direction of compression can be inserted. The small-diameter piston 34 is pressed forward into contact with the stopping section 38 by a small-diameter piston spring 42. The coil spring 40 is arranged in a free-length state so that it will be inserted in a through hole 44 provided in the front end section 43 of the floating piston 5, with its rear end set in contact with the receiving hole 41 of the small-diameter piston 34 and with its front end placed in contact with a recess section 45 formed in the cylinder front end wall 10. The elastic force of the coil spring 40 is set at a greater compressive elastic force than the elastic force of the small-diameter piston spring 42.

In the return state shown in FIG. 1, the distance Z from the head section 19 of the stopping rod 18 to the rear boss 39 of the small-diameter piston 34 is set equal to the distance X between the front end of the main piston 4 and the cup-shaped spring retainer 20. That is, the length of the small-diameter piston 34 is set so that Z will be equal to X.

Operation of the embodiment shown in FIG. 1 will be explained. First, normal operation will be explained.

When the push rod 8 is not pushed and therefore the main piston 4 and the floating piston 5 remain both in their return positions, the primary fluid pressure chamber 9 and the secondary fluid pressure chamber 11 communicate with the reservoir 6 via the return ports 22 and 30, respectively, being open to the atmosphere therein.

As the push rod 8 is pushed to the right, the secondary return spring 29 is compressed primary by the action of the primary return spring 21 having a greater mounting load than that of the secondary return spring 29, and the main piston 4 and the floating piston 5 move forward simultaneously while maintaining the distance shown. Accordingly, the return port 22 is closed by the piston seal 13 while the return port 30 by the piston seal 15, thus resulting in compression of the secondary fluid pressure chamber 11.

The coil spring 40 is so set that, when not operating (when not producing a fluid pressure), the coil spring 40 is in the state of free length, and therefore the elastic force thereof is zero, and as the fluid pressure is built up to compress the spring, the elastic force of the spring increases greater than that of the small-diameter piston spring 42. Therefore, with the advance of the floating piston 5 as described above, the small-diameter piston 34 held by the small-diameter piston spring 42 and the coil spring 40 having a greater elastic force than that of the small-diameter piston spring 42 is moved backward in relation to the floating piston 5 while compressing the small-diameter piston spring 42, thus decreasing the volume of the chamber 25 while increasing the volume of the chamber 37. Therefore, the forward stroke of the floating piston 5 corresponds to the sum of the quantity of the brake fluid discharged through the output port 32 plus the increased volume, that is, becomes great as compared with a cylinder without the small-diameter piston 34, thus alleviating the increase of the fluid pressure in the secondary fluid pressure chamber 11 until the passage of the piston seal 15 over the return port 30 and consequently preventing biting of the piston seal 15 by the return port 30 (this effect is similar to that of a prior art tandem master cylinder shown in FIG. 4).

In the meantime, the fluid pressure is built up in the primary fluid pressure chamber 9 by the volumetric decrease of the chamber 25 even when no change is made in the relative separate positions of the main piston 4 and the floating piston 5. This fluid pressure, however, corresponds to the product of the effective surface area of the small-diameter piston 34 and the amount of backward movement of the small-diameter piston 34 relative to the floating piston 5. Accordingly, the main piston 4 operates in such a manner that the piston seal 13 will not be bitten, allowing almost all the fluid pressure to be discharged for consumption through the output port 24.

As described above, when the main piston 4 and the floating piston 5 move forward until the piston seals 13 and 15 pass over the return ports 22 and 30, respectively, the secondary return spring 29 is compressed to decrease a load difference between the primary return spring 21 and the secondary return spring 29. When the spring load is balanced between the primary return spring 21 and the secondary return spring 29, the floating piston 5 is freely moved back and forth by the fluid pressure and therefore there exist balanced fluid pressures between the primary fluid pressure chamber 9 and the secondary fluid pressure chamber 11 and consequently the same fluid pressure is outputted at the output ports 24 and 32, being discharged into respective hydraulic braking systems to thereby operate the braking equipment.

FIG. 2(a) and FIG. 2(b) are views showing a difference in the positional relationship of the head section 19 of the stopping rod 18 relative to the rear boss 39 of the small-diameter piston 34 between the present invention and a prior art in the process of operation in which only the secondary fluid pressure chamber 11 is operated in case of a failure in fluid pressure buildup in the primary fluid pressure chamber 9. FIG. 2(a) shows one embodiment of the present invention shown in FIG. 1, and FIG. 2(b) shows a prior art shown in FIG. 4. In FIG. 2(a) and FIG. 2(b) are shown the tandem master cylinders respectively with the front end of the main piston 4 (61) immediately before contacting the cup-shaped spring retainer 20 (62) in the event of a failure in producing the fluid pressure in the primary fluid pressure chamber 9 (52). Reference numerals used in FIG. 2(b) are the same as those in FIG. 4 described above.

When the push rod 8 is pushed in case the hydraulic braking system connected to the primary fluid pressure chamber 9 has failed in brake application for some reason or other, the main piston 4 first makes an ineffective stroke for a distance X shown in FIG. 1 until the front end contacts the cup-shaped spring retainer 20. As shown in FIG. 2(a), the rear end portion of the small-diameter piston 34 is formed long enough to reach the position where the head section 19 of the stopping rod 18 contacts the boss 39 of the small-diameter piston 34; thereafter the small-diameter piston 34 moves forward with the advance of the main piston 4 while compressing the coil spring 40 without changing the relative positions of the floating piston 5 and the small-diameter piston 34, whereby the fluid pressure in the secondary fluid pressure chamber 11 increases. The floating piston 5 at this time is stroked by the coil spring 40 for the length of compression thereof, and therefore the stroke thus made is not included in Z shown in FIG. 1 which is the distance between the head section 19 of the stopping rod 18 and the rear boss 39 of the small-diameter piston 34.

Figure 4:
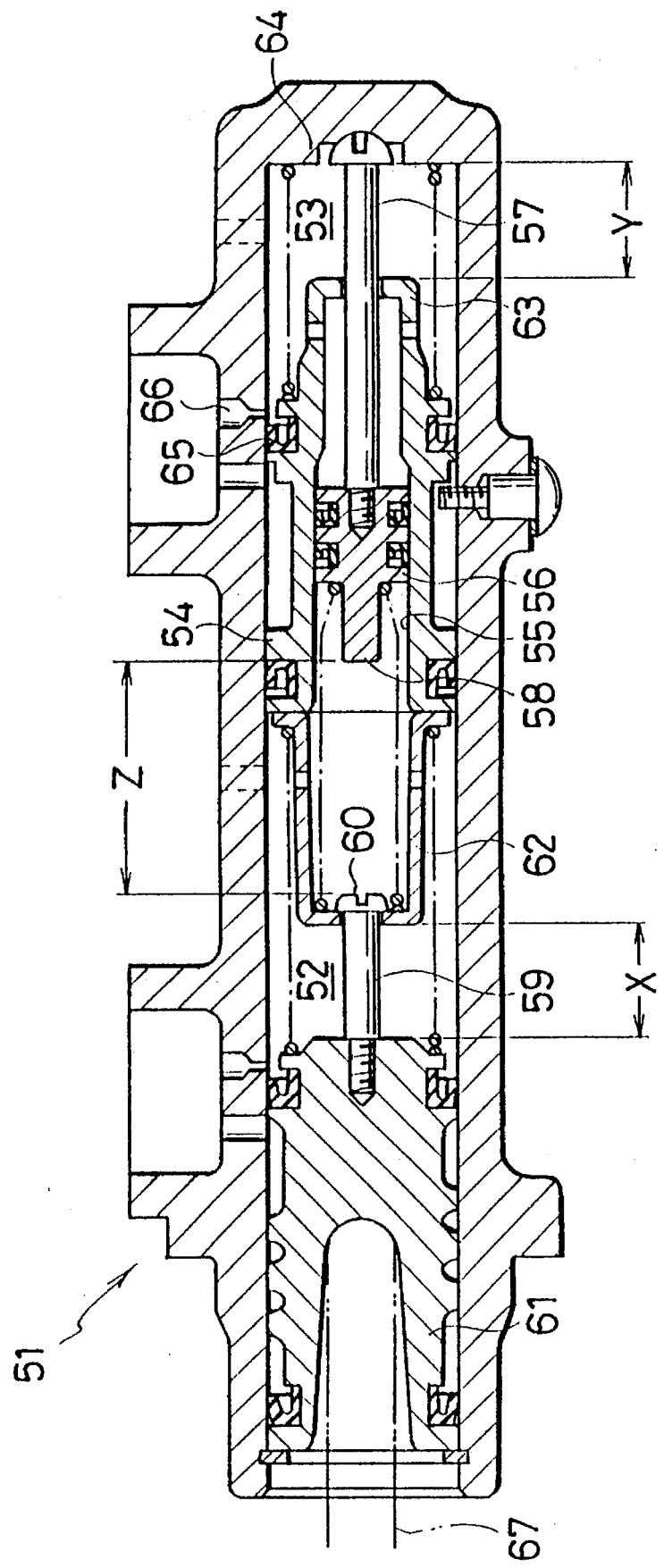
FIG. 4 is a sectional view showing one example of a prior art tandem master cylinder.

That is, since the rod member 57 used in a prior art tandem master cylinder is a non-elastic member as shown in FIG. 2(b) and FIG. 4, the distance Z between the head section 60 of the stopping rod 59 and the rear boss 58 of the small-diameter piston 56 is required, in normal operation, to be equal to the sum of the distance X between the front end section of the main piston 61 and the cup-shaped spring retainer 62 and the distance Y between the front end section 63 of the floating piston 54 and the front end wall 64 of the cylinder (Z=X+Y). According to one embodiment of the present invention shown in FIG. 1, however, the distance Z between the head section 19 of the stopping rod 18 and the rear boss 39 of the small-diameter piston 34 is sufficient if it is equal to the distance X (Z=X) between the front end of the main piston 4 in the return position and the cup-shaped spring retainer 20, and therefore it is possible to reduce the time lag required for increasing the fluid pressure on the secondary fluid pressure chamber 11 in case of a failure on the primary fluid pressure chamber 9.

Furthermore, in FIG. 1, in case of a failure on the secondary fluid pressure chamber 11, the fluid pressure in the primary fluid pressure chamber 9 rises after the contact (ineffective stroke Y) of the floating piston 5 with the cylinder front end wall 10. At this time, the boss 39 of the small-diameter piston 34 contacts the head section 19 of the stopping rod 18 once, but the small-diameter piston 34 moves forward with the rise of the fluid pressure in the primary fluid pressure chamber 9, stopping at the stop section 38 of the small-diameter cylinder 33.

Figure 3:
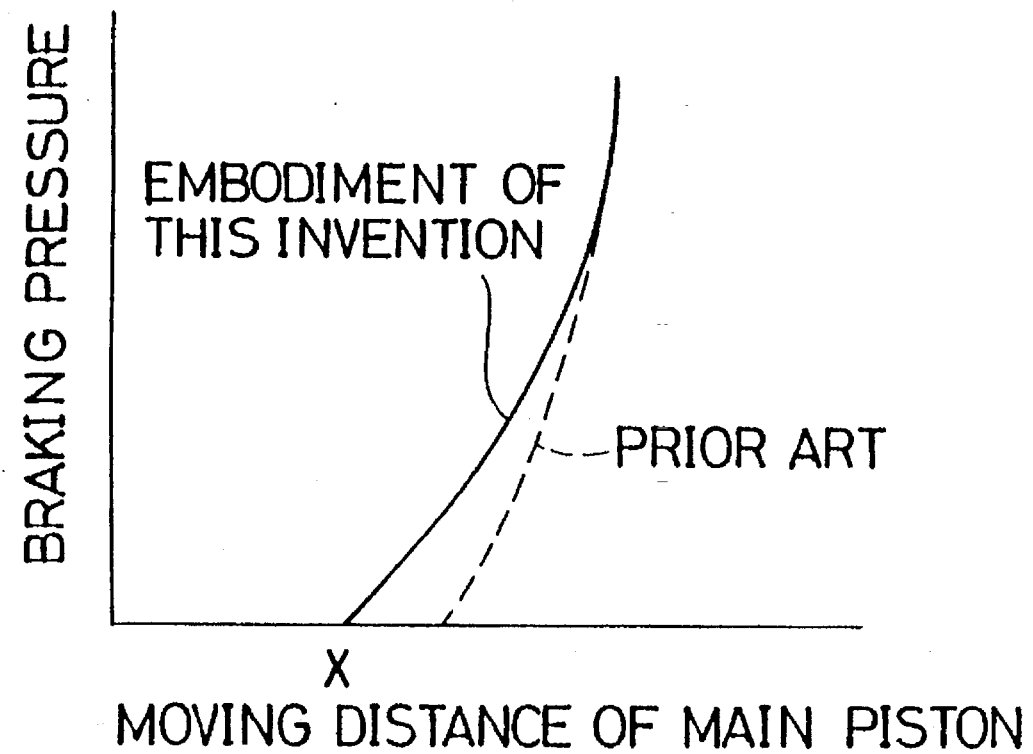
FIG. 3 is a view showing a relation between the fluid pressure of the secondary fluid pressure chamber and the amount of movement of the main piston.

FIG. 3 is a view showing a relationship between the braking pressure in the secondary fluid pressure chamber 11 and the moving distance of the main piston 4 in case of a failure on the primary fluid pressure chamber 9.

In the prior art tandem master cylinder, after the main piston 4 has made an ineffective stroke for the distance X, the small-diameter piston 56 further makes a relative backward movement with respect to the floating piston 54 which is moving forward, and no fluid pressure buildup takes place in the secondary fluid pressure chamber 53 until the boss 58 contacts the head section 60 of the stopping rod 59 which is moving forward. And as indicated by a broken line, a time lag has occurred in the fluid pressure rise. According to the present invention, however, the time lag is a time equivalent to the distance Z=X and therefore it is possible to decrease a time lag of the braking pressure transmitted to the braking equipment from the tandem master cylinder 1 in case of failure while preventing biting of the piston seals 13 and 15 by the return ports 22 and 30.

It is to be noticed that in the embodiment of FIG. 1, the coil spring 40, which is employed as an elastic member, is not limited to the embodiment and can be replaced with such an elastic member of rubber, synthetic resin, etc.

What is claimed is:

1. A tandem master cylinder comprising:

a cylinder having a bore with a front end including a front end wall, a rear end, an inner wall surface bordering the bore and a primary and a secondary return port both communicating with the bore;

a main piston movably disposed within the bore adjacent said rear end and a floating piston movably disposed within the bore between said main piston and said front end wall;

a primary fluid pressure chamber between said main piston and said floating piston and a secondary fluid pressure chamber between said floating piston and said front end wall;

a primary return spring at a rear end of said floating piston and a secondary return spring at a front end of said floating piston having a biasing force less than said primary return spring;

annular piston seals mounted on both of said pistons at front ends thereof, said seals sliding along said inner wall surface for opening and closing both of said return ports;

a small diameter cylinder formed within said floating piston coaxial with the cylinder bore and communicating with both of said fluid pressure chambers;

a small diameter piston movably disposed within said small diameter cylinder between said fluid pressure chambers;

a small diameter piston spring mounted within said small diameter cylinder for biasing said small diameter piston toward said secondary fluid pressure chamber;

a stop located within said small diameter cylinder to arrest movement of said small diameter piston toward said front end; and an elastic member normally disposed in an unbiased state between said small diameter piston and said front end wall, said elastic member having a restoring force when compressed which is greater than a restoring force of said small diameter piston spring, whereby during operation, said elastic member holds said small diameter piston against a restoring force of said small diameter piston spring to alleviate a pressure increase in said secondary fluid chamber so that said annular piston seal of said floating piston passes said respective return port without biting.

2. The tandem master cylinder according to claim 1, wherein said elastic member is a coil spring.

3. The tandem master cylinder according to claim 1, wherein said small diameter piston has a receiving hole at a front end thereof and said floating piston has a through hole formed in a front end section thereof;

wherein said elastic member is disposed within the through hole and said elastic member includes an end which is inserted into the receiving hole.

4. The tandem master cylinder according to claim 3, comprising a further chamber between said small diameter piston and said stop which communicates with said secondary fluid chamber via the through hole.

5. The tandem master cylinder according to claim 1, comprising a return position in which a first distance between said small diameter piston and said main piston is equal to a second distance between said main piston and said floating piston.

* * * * *